United States Patent
Xu et al.

(10) Patent No.: US 9,588,906 B2
(45) Date of Patent: Mar. 7, 2017

(54) REMOVING CACHED DATA

(71) Applicant: EMC Corporation, Hopkinton, MA (US)

(72) Inventors: Xinlei Xu, Beijing (CN); Yongjun Wu, Beijing (CN); Lei Xue, Beijing (CN); Xiongcheng Li, Beijing (CN); Peng Xie, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 172 days.

(21) Appl. No.: 14/495,379

(22) Filed: Sep. 24, 2014

(65) Prior Publication Data
US 2015/0095587 A1 Apr. 2, 2015

(30) Foreign Application Priority Data
Sep. 27, 2013 (CN) .......................... 2013 1 0466038

(51) Int. Cl.
*G06F 12/12* (2016.01)

(52) U.S. Cl.
CPC .................................. *G06F 12/126* (2013.01)

(58) Field of Classification Search
CPC ...... G06F 12/12; G06F 12/121–12/128; G06F 2212/6046
See application file for complete search history.

(56) References Cited

U.S. PATENT DOCUMENTS

| | | | | |
|---|---|---|---|---|
| 2003/0084247 A1* | 5/2003 | Song | ..................... | G06F 12/123 711/128 |
| 2003/0149843 A1* | 8/2003 | Jarvis | .................... | G06F 12/123 711/133 |
| 2005/0055512 A1* | 3/2005 | Kishi | .................. | G06F 12/0804 711/135 |
| 2010/0318744 A1* | 12/2010 | Benhase | ............. | G06F 12/0868 711/136 |
| 2012/0290786 A1* | 11/2012 | Mesnier | ............. | G06F 12/0866 711/113 |
| 2013/0205089 A1* | 8/2013 | Soerensen | ........... | G06F 12/0811 711/122 |
| 2014/0013053 A1* | 1/2014 | Sawin | ................. | G06F 12/0873 711/122 |
| 2014/0082288 A1* | 3/2014 | Beard | ............... | G06F 17/30132 711/123 |

(Continued)

*Primary Examiner* — Ryan Bertram
(74) *Attorney, Agent, or Firm* — Krishnendu Gupta; Konrad R. Lee

(57) ABSTRACT

Embodiments of the present invention provide a method and apparatus for removing cached data. The method comprises determining activeness of a plurality of divided lists; ranking the plurality of divided lists according to the determined activeness of the plurality of divided lists. The method comprises removing a predetermined amount of cached data from the plurality of divided lists according to the ranking result when the used capacity in the cache area reaches a predetermined threshold. Through embodiments of the present invention, the activeness of each divided list may be used to wholly measure the heat of access to the cached data included by each divided list, and upon removal, the cached data with lower heat of access in the whole system can be removed and the cached data with higher heat of access in the whole system can be retained so as to improve the read/write rate of the system.

18 Claims, 4 Drawing Sheets

(56) References Cited

U.S. PATENT DOCUMENTS

2014/0115261 A1* 4/2014 Maybee .............. G06F 12/0897
  711/136
2014/0223072 A1* 8/2014 Shivashankaraiah G06F 12/0871
  711/103

* cited by examiner

REMOVING CACHED DATA

RELATED APPLICATION

This Application claims priority from Chinese Patent Application Serial No. CN201310466038.3 filed on Sep. 27, 2013 entitled "METHOD AND DEVICE FOR REMOVING CACHE DATA" the content and teachings of which are hereby incorporated by reference in their entirety.

FIELD OF THE INVENTION

Embodiments of the present invention generally relate to the field of data storage, and more specifically, to removal of cached data.

BACKGROUND OF THE INVENTION

In the field of computing, a certain storage device is usually equipped to store data that is typically needed during operations. Compared to conventional hard disks, a flash disk has a higher read/write rate and can provide a high storage capacity up to TerraBytes (TB) through a flash disk array technology, so that it is applied more extensively. During use of the flash disk, commonly-used data in a plurality of disk partitions are usually put into a cache area so that these data are quickly accessible subsequently.

Since flash disks have a large storage capacity, they usually contain a large amount of cached data. When the cached data are stored, a plurality of divided lists is generated for a plurality of disk partitions. Each divided list contains cached data of the magnetic disk partition it corresponds to, and the cached data included in each divided list are ranked and placed according to heat of access to the cached data. When a certain cached data in the divided list is accessed recently, e.g., operations such as read, write, removal or substitution are performed for this cached data, the heat of access to this cached data is the highest and this cached data is ranked at the topmost position. Commonly-used data in the system change constantly and the capacity of the cache area is limited and data will not be automatically released even in the event of a power off, and therefore the cached data need to be removed constantly to improve a write/read rate of the flash disk.

When the used capacity in the cache area reaches a predetermined threshold, a conventional cached data removing method removes, in a cyclic manner, a piece of cached data ranked the bottommost from each divided list in turn, until a predetermined amount of cached data are removed.

However, there are certain drawbacks in the conventional technical solution. Since cached data with lower heat of access in the whole cache area cannot be determined exactly, the only measure is to simply remove the cached data ranked closer to the bottom from each divided list in a cyclic manner. This will lead to following situation wherein regarding a divided list with a higher activeness, for example, a divided list including more cached data which are more frequently accessed than that included in other divided lists, the cached data with higher heat of access in the whole cache area included in the divided list might be removed; in contrast, regarding a divided list with a lower activeness, the cached data with lower heat of access included in the divided list might not be removed, so that the read/write rate of the flash disk gets lower.

SUMMARY OF THE INVENTION

With respect to the technical problems existing in the prior art, various embodiments of the present invention provide for removal of cached data efficiently.

According to one aspect of the present disclosure, there is provided a method and an apparatus for removing cached data. The method comprises determining activeness associated with a plurality of divided lists; ranking the plurality of divided lists according to a predetermined criteria, such as determined activeness of the plurality of divided lists. The method also comprises removing a predetermined amount of cached data from the plurality of divided lists according to the ranking result when the used capacity in the cache area reaches a predetermined threshold.

According to an alternative embodiment of the present disclosure, the predetermined criteria of determining activeness of the plurality of divided lists comprises determining a recently overall accessed timestamp of each of the divided lists, wherein the recently overall accessed timestamp indicates a time when all cached data included in each of the divided lists are accessed most recently; wherein ranking the plurality of divided lists according to the determined activeness of the plurality of divided lists comprises ranking the plurality of divided lists according to the determined recently overall accessed timestamps.

According to an alternative embodiment of the present disclosure, an initial value of the recently overall accessed timestamp is a time for initializing each of the divided lists.

According to an alternative embodiment of the present disclosure, removing the predetermined amount of cached data from the plurality of divided lists according to the ranking result comprises cyclically determining a first removable amount of each of the divided lists in an ascending order, beginning with the divided list ranked the bottommost, wherein the first removable amount is associated with the number of divided lists, a ranking position of each divided list, the predetermined amount and the currently/most recently already-removed amount in the ranked divided lists; and removing the determined first removable amount of cached data starting from the cached data ranked the bottommost in each of the divided lists, until the predetermined amount of cached data are removed.

According to an alternative embodiment of the present disclosure, determining activeness of the plurality of divided lists comprises determining the amount of cached data in each of the divided lists not accessed in a predetermined time interval, wherein ranking the plurality of divided lists according to the determined activeness of the plurality of divided lists comprises ranking the plurality of divided lists according to the determined amounts of cached data that is not accessed.

According to an alternative embodiment of the present disclosure, each of the divided lists corresponds to one positioning cursor, and at an initial instant of the predetermined time interval, the positioning cursor points to the cached data ranked topmost in each of the divided lists, wherein determining the amount of cached data in each of the divided lists that is not accessed in the predetermined time interval comprises, with respect to the predetermined time interval, determining a ranking position of the cached data pointed by the positioning cursor in each of the divided lists; and determining the amount of the cached data in each of the divided lists from the cached data located at the determined ranking position to the cached data located at the bottommost ranking position, as the amount of cached data that is not yet accessed.

According to an alternative embodiment of the present disclosure, removing the predetermined amount of cached data from the plurality of divided lists according to the ranking result comprises cyclically removing at least one cached data that is not accessed included in each of the divided lists in an ascending order, beginning with the divided list ranked the bottommost, until the predetermined amount of cached data are removed.

According to an alternative embodiment of the present disclosure, cyclically removing at least one cached data not accessed included in each of the divided lists comprises removing at least one not-accessed cached data ranked bottommost in each of the divided lists each time in a cyclic manner.

According to an alternative embodiment of the present disclosure, when the sum of the amount of not-accessed cached data included in the plurality of divided lists is less than the predetermined amount, a further step is included of determining a recently overall accessed timestamp of each of the divided lists, wherein the recently overall accessed timestamp indicates a time when all cached data included in each of the divided lists are accessed most recently; ranking the plurality of divided lists according to the determined recently overall accessed timestamps; and removing a surplus removal amount of cached data beginning with the divided list ranked bottommost.

According to an alternative embodiment of the present disclosure, removing the surplus removal amount of cached data beginning with the divided list ranked bottommost comprises cyclically determining a second removable amount of each of the divided lists in an ascending order, beginning with the divided list ranked the bottommost, wherein the second removable amount is associated with the number of divided lists, a ranking position of each divided list, the surplus removal amount and the currently already-removed amount in the ranked divided lists; and removing the determined second removable amount of cached data starting from the cached data ranked the bottommost in each of the divided lists, until the surplus removal amount of cached data are removed.

By using the method and apparatus according to various aspects and embodiments of the present disclosure, the activeness of each divided list may be used to wholly measure the heat of access to the cached data included by each divided list, and upon removal, the cached data with lower heat of access in the whole system can be removed and the cached data with higher heat of access in the whole system can be retained so as to improve the read/write rate of the system.

It should be noted that flowcharts and block diagrams in the figures illustrate the method, apparatus, as well as architecture, functions and operations that might be achieved by a computer program product according to the embodiments of the present invention. In this regard, each block in the flowcharts or block diagrams may represent a module, a program segment, or a part of code, which contains one or more executable instructions for performing specified logic functions. It should also be noted that, in some alternative implementations, the functions notated in the block may occur out of the order notated in the figures. For example, two blocks shown consecutively may be performed in parallel substantially or in an inverse order sometimes, which depends on the involved functions. It should also be noted that each block in the block diagrams and/or flow charts and a combination of blocks in block diagrams and/or flow charts may be implemented by a dedicated hardware-based system for executing a prescribed function or operation or may be implemented by a combination of dedicated hardware and computer instructions.

DETAILED DESCRIPTION OF THE VARIOUS EXEMPLARY EMBODIMENTS

Principles and spirit of the present disclosure will be described with reference to several exemplary embodiments as illustrated in the figures. It should be appreciated that description of these embodiments is only intended to enable those skilled in the art to better understand and thereby implement the present disclosure, but not to limit the scope of the present disclosure in any manner.

It may be appreciated that although the disclosure made herein exemplarily illustrates effectively removing cached data in a flash disk or flash disk array, it may also effectively remove cached data in other kind of storage devices such as hard disk, and should not be construed to be limiting to flash disks.

Figure 1:
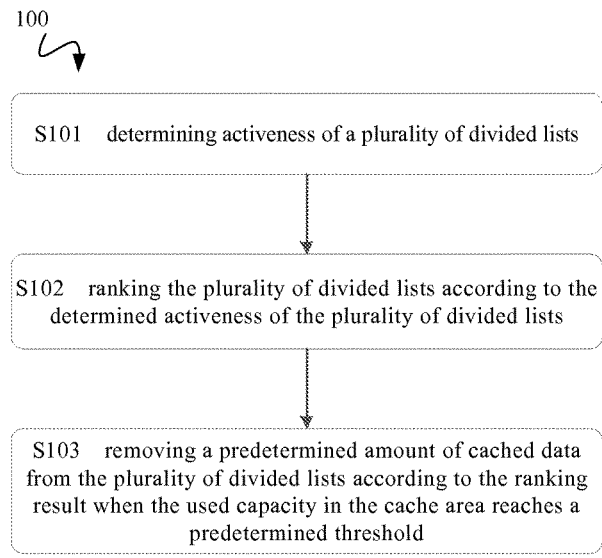
FIG. 1 illustrates an exemplary flow chart of a method 100 for removing cached data according to an embodiment of the present disclosure.

FIG. 1 illustrates an exemplary flow chart of a method 100 for removing cached data according to an embodiment of the present invention. It should be appreciated that steps recited in the method 100 may be executed in different orders, and/or executed in parallel. The method 100 may further comprise additional steps and/or omit execution of the illustrated steps. The scope of the present disclosure therefore is not limited in this aspect in any sense.

After the method 100 starts, activeness associated with (hereinafter also generally referred to as of) a plurality of divided lists is determined at step S101. The activeness of the plurality of divided lists may, on the whole, reflect heat associated with (hereinafter also generally referred to as of) access to all cached data included in each of the plurality of divided lists.

Subsequently, the method 100 proceeds to step S102 of ranking the plurality of divided lists according a predetermined criteria, for example to the determined activeness of the plurality of divided lists.

Thereafter, the method 100 proceeds to step S103 of removing a predetermined amount of cached data from the plurality of divided lists according to the ranking result when the used capacity in the cache area reaches a predetermined/preset threshold. Where the predetermined/preset threshold may be either an upper limit of the capacity of the cache area or a capacity value defined according to actual situations. The predetermined (also herein referred to as preset) threshold may be set by the user or in one embodiment; the system may automatically be programmed with a learning algorithm and use historical data with/without current real time data to set the threshold to a predetermined value. The predetermined amount is associated with current operation situations of the system. When the used capacity in the cache area reaches a predetermined threshold, the predetermined amount is greater if more cached data needs to be stored in the cache area, and the predetermined amount is smaller if less cached data needs to be stored in the cache area. Embodiments of the present invention do no limit the magnitude of the predetermined amount.

According to one embodiment of the present invention, the step S101 may further comprise determining a recently overall accessed timestamp of each of the divided lists, wherein the recently (most recent) overall accessed timestamp indicates a time when all cached data included in each of the divided lists are accessed most recently. Each cached data may be read, written, removed, replaced with other cached data or the like, when each cached data is accessed.

Figure 2A:
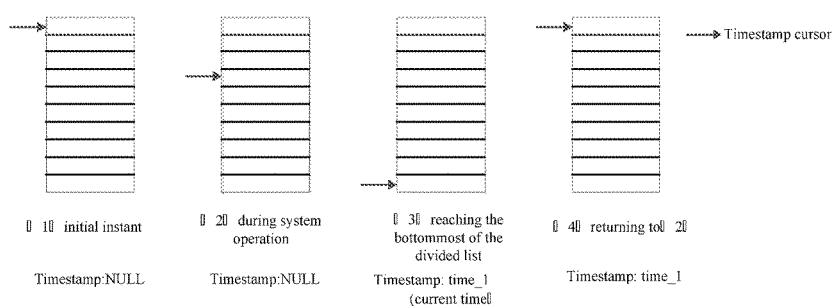
FIG. 2A and FIG. 2B illustrate an exemplary schematic view of an implementation for performing steps S101 and S102 of the method 100 of FIG. 1 according to an embodiment of the present disclosure.

Referring to FIG. 2A, which illustrates an exemplary implementation of determining the recently overall accessed timestamp of one of the plurality of divided lists. In FIG. 2A, specific steps include (1) first, setting a timestamp cursor for the plurality of divided list (hereinafter also referred to as divided list). At an initial instant, for example when the system starts and reloads cached data from the flash disk, the timestamp cursor points to cached data ranked the topmost in the current ranking in the divided list. The recently overall accessed timestamp is represented as Timestamp=NULL. (2) During operation of the system, cached data are accessed constantly, the most recently accessed cached data moves to the topmost-ranked position of the divided list, and the cached data pointed to by the timestamp cursor moves downward constantly. (3) When the cached data pointed to by the timestamp cursor moves to the bottommost-ranked position of the divided list, this indicates that all cached data included by the divided list at this time are accessed, and the current time is determined as the recently overall accessed timestamp of the divided list, namely, Timestamp=time_1 (current time). (4) Thereafter, the timestamp cursor changes to point to the cached data at the currently topmost-ranked position of the divided list, and the procedure returns to step (2) to continue to record the next recently overall accessed timestamp of the divided list.

The recently overall accessed timestamp may be determined for each of the divided lists in the exemplary implementation shown in FIG. 2A. It should be appreciated that the recently overall accessed timestamp of each divided list may be determined in other implementation besides the exemplary implementation shown in FIG. 2A. Embodiments of the present invention do not specifically limit this.

In order to prevent cached data included in some divided list from not all being accessed upon ranking the plurality of divided lists subsequently, an initial value of the recently overall accessed timestamp is a time for initializing each divided list according to an embodiment of the present invention. According to an alternative embodiment of the present invention, the initial value of the recently overall accessed timestamp may be any time before cached data included in each of the plurality of divided lists are not all accessed.

According to an embodiment of the present invention, after determining the recently overall accessed timestamp of each divided list, step S102 of the method 100 may further include ranking the plurality of divided lists according to the determined recently (most recent) overall accessed timestamps. Where if the recently overall accessed timestamp of one divided list is relatively great, i.e., closer to current time when ranking is performed, this indicates that the activeness of the divided list is higher, and its ranking position is closer to the top; and on the contrary, if the recently overall accessed timestamp of one divided list is relatively small, this indicates that the activeness of the divided list is lower.

Furthermore, the ranked plurality of divided lists may be linked together in a form of double linked list to facilitate subsequent access to the cached data included in the double linked list.

Figure 2B:
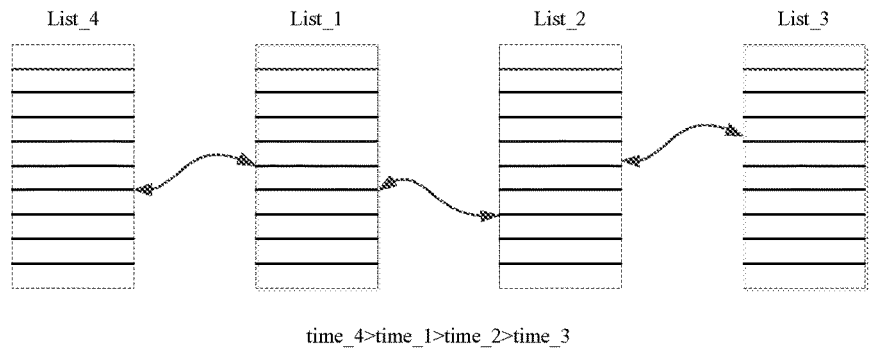

For example, referring to FIG. 2B, illustrated are four divided lists, namely, List_1, List_2, List_3 and List_4 respectively. Their recently overall accessed timestamps are time_1, time_2, time_3 and time_4 respectively, wherein time_4>time_1>time_2>time_3. Thereby, the ranking result shown in FIG. 2B is obtained after the four divided lists are ranked according to the determined recently overall accessed timestamps and the ranked divided lists are linked together in the form of double linked list.

According to an embodiment of the present invention, step S103 of the method 100 may further include cyclically determining a first removable amount of each of the divided lists in an ascending manner, beginning with the divided list ranked the bottommost, wherein the first removable amount is associated with the number of divided lists, the ranking position of each divided list, the predetermined amount and the currently already-removed amount in the ranked divided lists; and removing the determined first removable amount of cached data starting from the cached data ranked the bottommost in each of the divided lists, until the predetermined amount of cached data are removed.

The first removable amount of each divided list is associated with the number of the divided lists and the ranking position of each divided list. As compared to the cached data included in the divided lists with lower activeness, the cached data included in the divided lists with higher activeness have a higher probability of being accessed during subsequent system operation. Therefore, when removing cached data, a smaller amount of cached data may be removed from the divided list with higher activeness and a greater amount of cached data are removed from the divided list with lower activeness so that the cached data with a higher access probability are still stored in the cache area and thus the read/write rate of the flash disk is improved.

In addition, the first removable amount of each divided list is further associated with the predetermined amount and the currently already-removed amount in the ranked divided lists. When removing the cached data, the removal usually begins with the divided list ranked bottommost among the ranked divided lists, then the first removable amount of each divided list is determined cyclically in an ascending order, and the first removable amount of cached data are removed from the divided list. Upon cycling in the ascending order, the currently removed amount for the currently cycled divided list is a sum of the first removable amount of previously cycled divided lists.

It should be noted that upon completion of the cycling of the plurality of divided lists for the first time, the predetermined amount of cached data might not be removed, whereupon the cached data may continue to be removed cyclically beginning with the divided list ranked bottommost until the predetermined amount of buffer amount are removed. Besides, when removing the first removable amount of cached data from each divided list, the determined first removable amount of cached data may be removed beginning with the cached data ranked bottommost in each divided list. Since the cached data ranked closer to the bottom in each divided list are data with lower heat of access than the cached data ranked closer to the top, a probability of affecting the read/write rate of the flash disk is smaller after it is removed.

It is should be appreciated that embodiments of the present invention are not limited to how to specifically determine the first removable amount of each divided list according to the number of divided lists, the ranking position of each divided list, the predetermined amount and the currently already-removed amount in the ranked divided lists, and furthermore, the first removable amount might be only associated with one or more of the above four parameters as long as the first removable amount of each divided list as obtained by calculation is ensured to be in a direct proportional relationship to the ranking position of each divided list, that is, the closer to the bottom the ranking position of the divided list is, the larger the corresponding first removable amount/quantity.

The above describes an implementation of ranking the plurality of divided lists and removing the predetermined amount of cached data according to the recently overall accessed timestamp of each divided list. According to another embodiment of the present invention, step S101 of the method 100 may further include determining the amount of cached data in each of the divided lists not accessed in a predetermined time interval, wherein the predetermined time interval may be set according to actual situations, for example, may be set as one hour, 2 hours, 24 hours or the like. Embodiments of the present invention do not specifically limit this. The cached data not accessed in the predetermined time interval refer to cached data not yet read, written, removed, replaced with other cached data or the like in the predetermined time interval.

According to one embodiment of the present invention, each of the divided lists corresponds to one positioning cursor. At an initial instant of the predetermined time interval, the positioning cursor points to the cached data ranked topmost in each of the divided lists. Determining the amount of cached data in each divided list not accessed in the predetermined time interval includes with respect to the predetermined time interval, determining a ranking position of the cached data pointed by the positioning cursor in each of the divided lists; and determining the amount of the cached data in each of the divided lists from the cached data located at the determined ranking position to the cached data located at the bottommost ranking position, as the amount of cached data that has not yet been accessed.

Figure 3A:
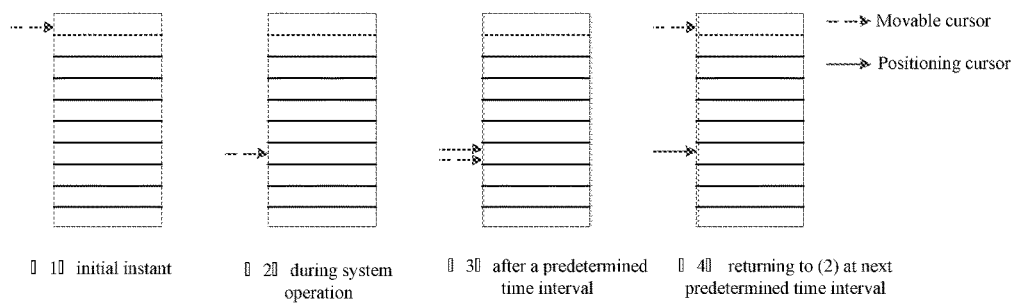
FIG. 3A and FIG. 3B illustrate an exemplary schematic view of another implementation for performing steps S101 and S102 of the exemplary method 100 of FIG. 1 according to an embodiment of the present disclosure.

Referring to FIG. 3A, it illustrates an exemplary implementation of determining the amount of cached data that has not yet been accessed in the predetermined time interval in one of the plurality of divided lists.

Illustrated in FIG. 3A, a solid cursor is the positioning cursor and a dotted cursor is a movable cursor for assisting the positioning of the positioning cursor. Specific steps include (1) at the initial instant, for example when the system starts and reloads cached data from the flash disk, the movable cursor points to cached data ranked topmost in the current ranking within the divided list, whereupon the amount of cached data not yet accessed in the divided list is assigned an initial value, zero. (2) During operation of the system, cached data are accessed constantly, the most recently accessed cached data moves to the topmost-ranked position in the divided list, and the cached data pointed to by the movable cursor moves downward constantly. (3) After the predetermined time interval, the positioning cursor points to the cached data pointed to by the movable cursor, a ranking position of the cached data pointed to by the positioning cursor in the divided list is determined, and the amount of the cached data in the divided list from the cached data located at the determined ranking position to the cached data located at the bottommost ranking position is determined as the amount of cached data that has not yet been accessed. For example, as shown in FIG. 4A, the determined amount of the cached data that has not yet been accessed is four. (4) Thereafter, the position indicated by the positioning cursor does not change, the movable cursor changes to point to the cached data at the currently topmost-ranked position of the divided list, and the procedure returns to step (2) to continue to determine for next predetermined time interval the amount of cached data of the divided list that has not yet been accessed.

Regarding each divided list, the amount of cached data not yet accessed in the predetermined time interval may be determined as shown in FIG. 3A. In addition to the implementation shown in FIG. 3A, according to an alternative embodiment of the present invention, only the positioning cursor may be employed to determine the amount of cached data not accessed in the predetermined time interval in each divided list. Specifically, the positioning cursor moves in place of the above moveable cursor, and in the above mentioned step (3), the amount of the cached data from the cached data located at the ranking position indicated by the positing cursor to the cached data located at the bottommost ranking position is determined as the amount of cached data not accessed, and the determined amount of the cached data that has not been accessed is recorded. Then, at step (4), the positioning cursor continues to change to point to the cached data at the currently topmost-ranked position in the divided list.

It should be appreciated that embodiments of the present invention are not limited to the exemplified implementations of determining the amount of cached data not accessed in the predetermined time interval in each of the divided lists.

After the amount of cached data not accessed in the predetermined time interval in each of the divided lists is determined, step S102 in the method 100 may include ranking the plurality of divided lists according to the determined amounts of cached data not accessed, wherein if the amount of cached data not accessed in the predetermined time interval is greater, this indicates that the activeness of the divided list is lower, and the ranking position is closer to the bottom; and on the contrary, if the amount of cached data not accessed in the predetermined time interval is smaller, this indicates that the activeness of the divided list is higher, and the ranking position is closer to the top.

Furthermore, the ranked plurality of divided lists may be linked together in a form of double linked list to facilitate subsequent access to the cached data included in the plurality of divided lists.

Figure 3B:
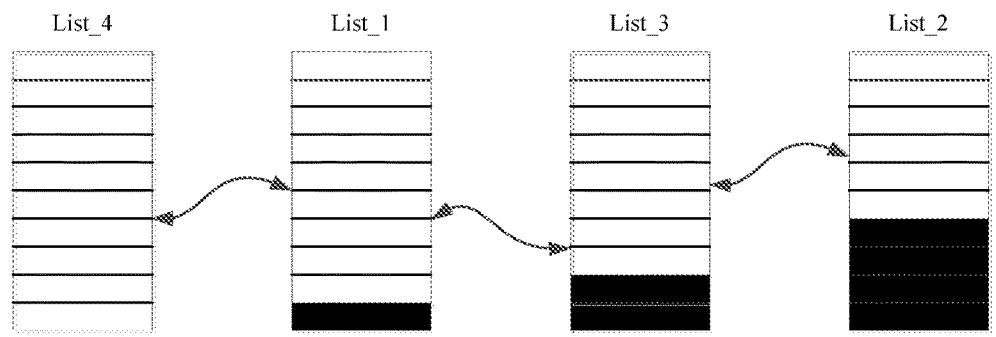

For example, referring to FIG. 3B, it shows four divided lists, namely, List_1, List_2, List_3 and List_4 respectively. The amounts of cached data not accessed in the predetermined time interval are 1, 4, 2, and 0 respectively. Black blocks in the figure represent the cached data that has not yet been accessed. Hence, the ranking result shown in FIG. 3B is obtained after the plurality of divided lists are ranked according to the determined amounts of cached data not accessed and the ranked divided lists are linked together in the form of double linked list.

After the plurality of divided lists are ranked according to the determined amounts of cached data not accessed, according to an embodiment of the present invention, step S103 of the method 100 includes cyclically removing at least one cached data not accessed included in each of the divided lists in an ascending manner, beginning with the divided list ranked the bottommost, until the predetermined amount of cached data are removed.

Since the cached data not accessed in the predetermined time interval in each divided list are cached data in the divided list with lower heat of access and the probability of being accessed again in any subsequent system operation is lower, a probability of affecting the read/write rate of the flash disk is smaller when these cached data are removed.

According to another embodiment of the present invention, the cyclically removing at least one cached data not accessed included in each divided list includes removing at least one not-accessed cached data ranked bottommost in each of the divided lists each time in a cyclic manner. According to an alternative embodiment of the present invention, at least one not-accessed cached data (cache data that has not yet been accessed) included in each of the divided lists may be arbitrarily removed in a cyclic manner. According to an alternative embodiment of the present invention, all not-accessed cached data included in each divided list may be removed in an ascending manner, beginning with the divided list ranked the bottommost, until the predetermined amount of cached data are removed.

If the sum of the amount of not-accessed cached data included in the plurality of divided lists is larger than or equal to the predetermined amount, the predetermined amount of cached data may be removed after the not-accessed cached data included in each divided list are cyclically removed in an ascending manner. If the sum of the amount of not-accessed cached data included in the plurality of divided lists is less than the predetermined amount, a surplus amount of cached data are not yet removed after all not-accessed cached data included in the plurality of divided lists are removed completely. The magnitude of the surplus removal amount is a differential between the predetermined amount and the sum of the amount of not-accessed cached data included in the plurality of divided lists.

According to an embodiment of the present invention, when the sum of the amount of not-accessed cached data included in the plurality of divided lists is less than the predetermined amount, step S103 includes determining a recently overall accessed timestamp of each of the divided lists, wherein the recently overall accessed timestamp indicates a time when all cached data included in each of the divided lists are accessed most recently; ranking the plurality of divided lists according to the determined recently overall accessed timestamps; and removing the surplus removal amount of cached data beginning with the divided list ranked bottommost.

According a further embodiment of the present invention, the removing the surplus removal amount of cached data beginning with the divided list ranked bottommost includes cyclically determining a second removable amount of each of the divided lists in an ascending manner, beginning with the divided list ranked the bottommost, wherein the second removable amount is associated with the number of divided lists, the ranking position of each divided list, the surplus removal amount and the currently already-removed amount in the ranked divided lists; and removing the determined second removable amount of cached data starting from the cached data ranked the bottommost in each divided list, until the surplus removal amount of cached data are removed.

It may be appreciated that the mode of removing the surplus removal amount of cached data from the plurality of divided lists is identical with the previously stated mode of implementing steps S101-S103 of the method 100 according to the recently overall accessed timestamps. It should be noted that the currently already removed amount in the ranked divided lists refer to the currently already-removed amount during removal of the surplus removal amount of cached data.

Figure 3C:
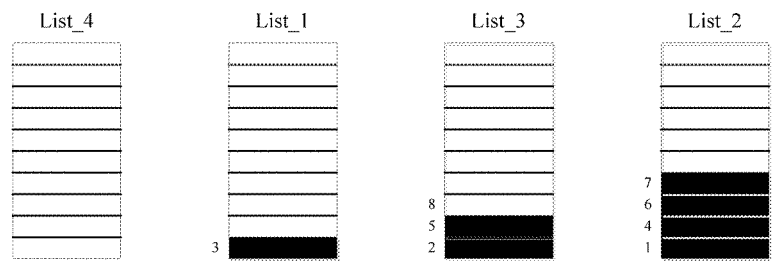
FIG. 3C illustrates an exemplary schematic view of an implementation for performing step S103 of the exemplary method 100 of FIG. 1 according to an embodiment of the present invention.

For example, referring to FIG. 3C, the sum of the amount of not-accessed cached data in the predetermined time interval in the four divided lists is seven, and the predetermined amount is eight. First, the not-accessed cached data included in each divided list are cyclically removed in an ascending manner according to the ranking result shown in FIG. 3B, wherein the cached data marked with serial numbers 1, 2, . . . , 7 are the cached data sequentially removed during the cycling. After seven cached data are removed, in order to further remove the surplus one cached data, the four divided lists may be ranked according to the recently overall accessed timestamps of the four divided lists. Therefore, according to the previously disclosed embodiment, one cached data ranked bottommost may be removed from the divided list List_3 ranked last.

According to an embodiment of the present invention, first, the cached data are removed according to the amounts of the not-accessed cached data in the predetermined time interval in each divided list; when the amount of the not-accessed cached data is smaller than the predetermined amount, the cached data are removed according to the recently overall accessed timestamp of each divided list so as to ensure that the removed cached data are those with lower heat of access on the whole, and a probability of affecting the read/write rate of the flash disk is lower after these cached data are removed. According to an embodiment of the present invention, ranking the plurality of divided lists according to the amounts of the not-accessed cached data in the predetermined time interval in each divided list is executed in parallel with ranking the plurality of divided lists according to the recently overall accessed timestamp of each divided list.

According to an alternative embodiment of the present invention, when the sum of the amount of not-accessed cached data included in the plurality of divided lists is less than the predetermined amount, at least one cached data included in each divided list is cyclically removed in an ascending manner, beginning with the divided list ranked last among the ranked divided lists, according to the amount of the not-accessed cached data in the predetermined time interval, until the surplus amounts of cached data are removed. At least one cached data is removed each time beginning with the cached data ranked bottommost in each divided list.

According to a further embodiment of the present invention, the surplus removal amount of cached data may be removed directly from the divided list ranked last among the ranked divided lists according to the amount of the not-accessed cached data in the predetermined time interval, wherein the surplus amounts of cached data may be removed beginning with the cached data ranked bottommost in the divided list, or at least one cached data is removed from any one or more divided lists until the surplus amounts of cached data are removed. At least one cached data is removed each time beginning with the cached data ranked bottommost in the divided list.

It is noted that since data to be buffered during operation of the system change constantly and the capacity of the cache area is limited, the method provided by embodiments of the present invention may be re-used to constantly remove the cached data with lower heat of access to facilitate storage of new cached data into the cache area.

During implementation of the embodiments of the present invention, the above first implementation of ranking divided lists and removing the cached data according to the recently overall accessed timestamps may be cross-used with the above-mentioned second implementation of ranking divided lists and removing the cached data according to the amount of the not-accessed cached data in the predetermined time interval.

According to an embodiment of the present invention, it is feasible to remove a certain amount of cached data in the first implementation and then remove the surplus amount of cached data in the second implementation until all the predetermined amount of cached data are removed. According to another embodiment of the present invention, it is feasible to remove a certain amount of cached data in the second implementation and then remove the surplus amount of cached data in the first implementation until all the predetermined amount of cached data are removed. According to an embodiment of the present invention, it is feasible to rank the plurality of divided lists by the ranking method provided by the second implementation and determine the amount of removable cached data in each divided list by the removing method provided by the first implementation so as to remove all the predetermined amount of cached data from the plurality of divided lists.

The preceding text has illustrated the spirit and principles of the present disclosure in combination with several specific exemplary embodiments. Through various embodiments of the present invention, the activeness of each divided list may be used to wholly measure the heat of access to the cached data included by each divided list, and upon removal, the cached data with lower heat of access in the whole system can be removed and the cached data with higher heat of access in the whole system can be retained so as to improve the read/write rate of the system. Furthermore, according to the activeness of each divided list, the amount of cached data removed from the divided lists with higher heat of access may be ensured smaller and the amount of cached data removed from the divided lists with lower heat of access may be ensured larger, taking into account fairness and activeness of each divided list.

Figure 4:
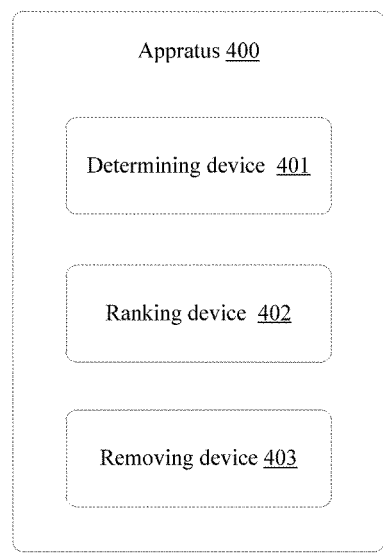
FIG. 4 illustrates an exemplary block diagram of an apparatus 400 for removing cached data according to an embodiment of the present invention.

FIG. 4 illustrates an exemplary block diagram of an apparatus 400 for removing cached data according to an embodiment of the present invention. As shown in FIG. 4, the apparatus 400 includes a determining device 401 configured to determine activeness associated with the plurality of divided lists; a ranking device 402 configured to rank the plurality of divided lists according to the determined activeness of the plurality of divided lists. The apparatus 400 also comprises a removing device 403 configured to remove predetermined amounts of cached data from the plurality of divided lists according to the ranking result when the used capacity in the cache area reaches/approaches a predetermined threshold.

The apparatus 400 of FIG. 4 may implement the method shown in FIG. 1, and although not further illustrated herein, the apparatus may comprise additional function units to implement a plurality of embodiments described in combination with the method 100 of FIG. 1. Furthermore, the apparatus 400 may wholly measure the heat of access to the cached data included by each divided list by using the activeness of each divided list, and upon removal, remove the cached data with lower heat of access in the whole system and retain the cached data with higher heat of access in the whole system so as to improve the read/write rate of the system.

According to another aspect of the present invention, there is provided an apparatus for removing cached data. The apparatus comprises: a determining device configured to determine activeness of a plurality of divided lists; a ranking device configured to rank the plurality of divided lists according to the determined activeness of the plurality of divided lists. The apparatus also comprises a removing device configured to remove a predetermined amount of cached data from the plurality of divided lists according to the ranking result when the used capacity in the cache area reaches a predetermined threshold. In one embodiment the determining device the receiving device and the removing device can be combined into a single controlling device that is configured to perform the tasks of each of these devices.

According to an alternative embodiment of the present invention, the determining device is further configured to determine a recently overall accessed timestamp of each of the divided lists, wherein the recently overall accessed timestamp indicates a time when all cached data included in each of the divided lists are accessed most recently; wherein the ranking device is further configured to rank the plurality of divided lists according to the determined recently overall accessed timestamps.

According to an alternative embodiment of the present invention, an initial value of the recently overall accessed timestamp is a time for initializing each of the divided lists.

According to an alternative embodiment of the present invention, the removing device is further configured to cyclically determine a first removable amount of each of the divided lists in an ascending order, beginning with the divided list ranked the bottommost, wherein the first removable amount is associated with the number of divided lists, a ranking position of each divided list, the predetermined amount and the currently already-removed amount in the ranked divided lists; and to remove the determined first removable amount of cached data starting from the cached data ranked the bottommost in each of the divided lists, until the predetermined amount of cached data are removed.

According to an alternative embodiment of the present invention, the determining device is further configured to determine the amount of cached data in each of the divided lists not accessed in a predetermined time interval, wherein the ranking device is further configured to rank the plurality of divided lists according to the determined amounts of cached data not accessed.

According to an alternative embodiment of the present invention, each of the divided lists corresponds to one positioning cursor, and at the initial instant of the predetermined time interval, the positioning cursor points to the cached data ranked topmost in each of the divided lists, wherein the determining device is further configured to, with respect to the predetermined time interval, determine a ranking position of the cached data pointed by the positioning cursor in each of the divided lists; and to determine the amount of the cached data in each of the divided lists from the cached data located at the determined ranking position to the cached data located at the bottommost ranking position, as the amount of cached data not accessed.

According to an alternative embodiment of the present invention, the removing device is further configured to cyclically remove at least one cached data not accessed included in each of the divided lists in an ascending order, beginning with the divided list ranked the bottommost, until the predetermined amount of cached data are removed.

According to an alternative embodiment of the present invention, the removing device is further configured to remove at least one not-accessed cached data ranked bottommost in each of the divided lists each time in a cyclic manner.

According to an alternative embodiment of the present invention, when the sum of the amount of not-accessed cached data included in the plurality of divided lists is less than the predetermined amount, the removing device further comprises a timestamp determining device configured to determine a recently overall accessed timestamp of each of the divided lists, wherein the recently overall accessed timestamp indicates a time when all cached data included in each of the divided lists are accessed most recently; a timestamp ranking device configured to rank the plurality of divided lists according to the determined recently overall accessed timestamps; and a surplus removal device configured to remove a surplus removal amount of cached data beginning with the divided list ranked bottommost.

According to an alternative embodiment of the present invention, the removing device is further configured to cyclically determine a second removable amount of each of the divided lists in an ascending order, beginning with the divided list ranked the bottommost, wherein the second removable amount is associated with the number of divided lists, a ranking position of each divided list, the surplus removal amount and the currently already-removed amount in the ranked divided lists; and to remove the determined second removable amount of cached data starting from the cached data ranked the bottommost in each of the divided lists, until the surplus removal amount of cached data are removed.

According to a further aspect of the present invention, there is provided an apparatus, comprising at least one processor and at least one memory including computer program code; the processor and the memory are configured to, with the processor, cause the apparatus to at least execute the following: determining activeness of the plurality of divided lists; ranking the plurality of divided lists according to the determined activeness; and removing a predetermined amount of cached data from the ranked divided lists when the already-used capacity in the cache area reaches a predetermined threshold; wherein each of the divided lists includes cached data of a disk partition it corresponds to, and the cached data included by each of the divided lists are ranked and placed according to heat of access to the cached data. It should be obvious to one skilled in the art that a single controlling device can replace each of the individual devices and the controlling device can perform the tasks independently or simultaneously that can be achieved by each of the individual devices.

Figure 5:
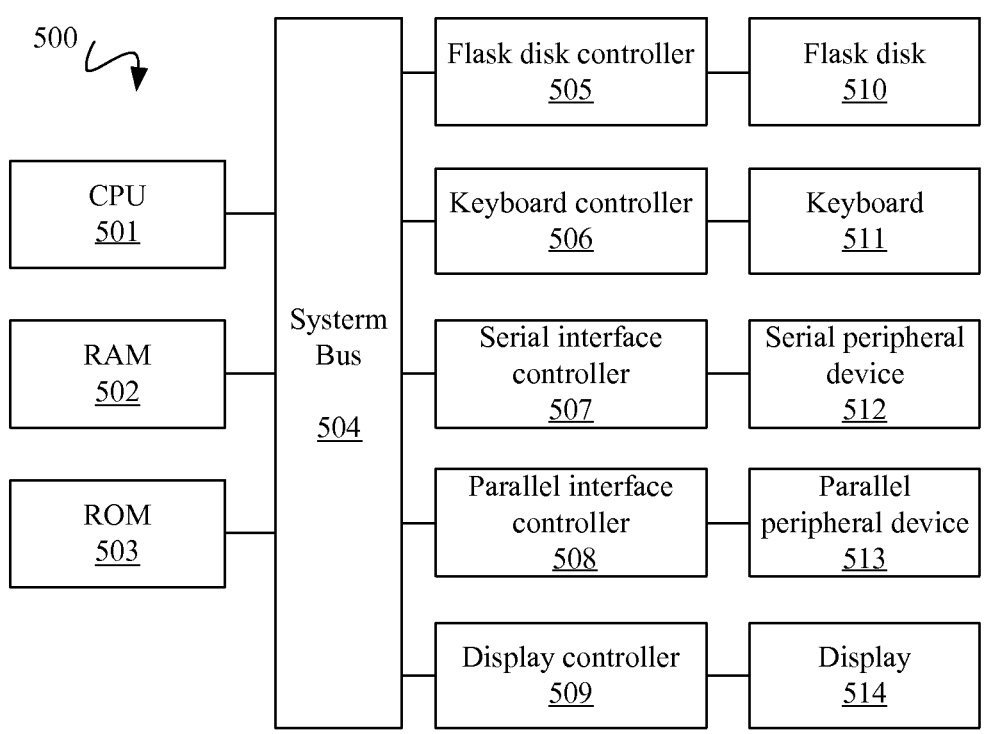
FIG. 5 illustrates an exemplary schematic block diagram of a computer system adapted to implement embodiments of the present invention.

FIG. 5 illustrates an exemplary block diagram of a system 500, for example a computer system or a mobile phone or a portable electronic device comprising at least a memory and a processor, that is adapted to implement the embodiments of the present invention. As shown in FIG. 5, the system (hereinafter referred to as a computer system) may include a CPU (Central Processing Unit) 501, a RAM (Random Access Memory) 502, a ROM (Read Only Memory) 503, a system bus 504, a flash disk controller 505, a keyboard controller 506, a serial interface controller 507, a parallel interface controller 508, a display controller 509, a flash disk 510, a keyboard 511, a serial peripheral device 512, a parallel peripheral device 515 and a display 514. Among these components, connected to the system bus 504 are CPU 501, RAM 502, ROM 503, the flash disk controller 505, the keyboard controller 506, the serial interface controller 507, the parallel interface controller 508 and the display controller 509. The flash disk 510 is coupled to the flash disk controller 505; the keyboard 511 is coupled to the keyboard controller 506; the serial peripheral device 512 is coupled to the serial interface controller 507; the parallel peripheral device 515 is coupled to the parallel interface controller 508; and the display 514 is coupled to the display controller 509.

At least one of memories illustrated in FIG. 5 includes a computer program code, the processor CPU 501 and the memory are configured to with the CPU 501, cause the computer system 500 to at least execute the following—determining activeness associated with the plurality of divided lists; ranking the plurality of divided lists according to the determined activeness; and removing a predetermined amount of cached data from the ranked divided lists when the used capacity in the cache area reaches a predetermined threshold; wherein each divided list includes cached data of the disk partition it corresponds to, and the cached data included by each divided list are ranked and placed according to heat of access to the cached data.

It should be understood that the structural block diagram in FIG. 5 is shown only for illustration purpose, and is not intended to limit the scope of the present invention. In some cases, some devices may be added or reduced according to actual situations.

Particularly, besides the hardware embodiments, embodiments of the present invention may be implemented in the form of a computer program product. For example, the method 100 as described with reference to FIG. 1 may be implemented via a computer program product. This computer program product may be stored in RAM 502, ROM 503, flash disk 510 as illustrated in FIG. 5 and/or any suitable tangible storage medium, or downloaded to the computer system 500 from a suitable location via the network, for example when the computer program code is stored on a cloud or a remote server. The network in use may be wired, wireless or a combination thereof. The computer program product may comprise a computer code portion that includes a program instruction that may be executed through a suitable processing device (for example, CPU 501 in FIG. 5). The program instruction may at least include determining activeness of (associated with) the plurality of divided lists; ranking the plurality of divided lists according to the determined activeness of the plurality of divided lists; and removing a predetermined amount of cached data from the plurality of divided lists according to the ranking result when the used capacity in the cache area reaches a predetermined threshold.

It should be noted that, the embodiments of the present invention can be implemented by software, hardware or the combination thereof. The hardware part can be implemented by a special logic; the software part can be stored in a memory and executed by a proper instruction execution system such as a microprocessor or a design-specific hardware. Those ordinary skilled in the art may understand that the above method and system may be implemented by using a computer-executable instruction and/or by being included in a processor control code, for example, such code is provided on a carrier medium such as a magnetic disk, CD, or DVD-ROM, or a programmable memory such as a read-only memory (firmware) or a data carrier such as an optical or electronic signal carrier. The apparatuses and their modules in the present disclosure may be implemented by hardware circuitry of a programmable hardware device such as super-large integrated circuit or gate array, a semiconductor such as logical chip or transistor, or a field-programmable gate array, or a programmable logical device, or implemented by software executed by various kinds of processors, or implemented by the combination of the above hardware circuitry and software, for example firmware.

It should be noted that although a plurality of means or sub-means of the apparatus have been mentioned in the above detailed depiction, such partitioning is merely non-compulsory. In actuality, according to the embodiments of the present disclosure, the features and functions of the above described two or more means may be embodied in one means. In turn, the features and functions of the above described one means may be further divided and embodied by a plurality of means.

Besides, although operations of the method of the present disclosure are described in a particular sequence in the drawings, it does not require or imply that these operations must be performed according to this particular sequence, or a desired outcome can only be achieved by performing all shown operations. On the contrary, the execution order for the steps as depicted in the flowcharts may be varied. Additionally or alternatively, some steps may be omitted, a plurality of steps may be merged into one step, and/or a step may be divided into a plurality of steps for execution.

Although the present disclosure has been depicted with reference to a plurality of embodiments, it should be understood that the present disclosure is not strictly limited to the exemplary embodiments that have been disclosed. The present disclosure intends to cover various modifications and equivalent arrangements included in the spirit and scope of the appended claims. The scope of the appended claims meets the broadest explanations and covers all such modifications and equivalent structures and functions.

What is claimed is:

1. A method for removing cached data, comprising:
  determining an activeness associated with a plurality of divided lists;
  ranking the plurality of divided lists according to the activeness of the plurality of divided lists;
  removing a predetermined amount of cached data from the plurality of divided lists in accordance with the ranking of the plurality of divided lists when the used capacity in the cache area reaches a predetermined threshold; and
  wherein removing the predetermined amount of cached data from the plurality of divided lists according to the ranking of the plurality of the divided lists comprises:
    cyclically determining a first removable amount of each of the plurality of divided lists in an ascending order, beginning with the plurality of divided list ranked the bottommost, wherein the first removable amount is associated with the number of plurality of divided lists, a ranking position of each plurality of divided list, the predetermined amount and the currently already-removed amount in the ranked plurality of divided lists; and
    removing the first removable amount of cached data starting from the cached data ranked the bottommost in each of the plurality of divided lists, until the predetermined amount of cached data is removed.

2. The method according to claim 1, wherein determining an activeness associated with the plurality of divided lists comprises:
  determining a recently overall accessed timestamp for each of the plurality of divided lists, wherein the recently overall accessed timestamp indicates a time when all cached data included in each of the plurality of divided lists are accessed most recently; and
  wherein ranking the plurality of divided lists according to the activeness of the plurality of divided lists comprises:
    ranking the plurality of divided lists according to the recently overall accessed timestamps.

3. The method according to claim 2, wherein an initial value of the recently overall accessed timestamp is a time for initializing each of the plurality of divided lists.

4. The method according to claim 1, wherein determining an activeness associated with the plurality of divided lists comprises:
  determining the amount of cached data in each of the plurality of divided lists not accessed in a predetermined time interval; and
  wherein ranking the plurality of divided lists according to the activeness associated with the plurality of divided lists comprises:
    ranking the plurality of divided lists according to the determined amounts of cached data not accessed.

5. The method according to claim 4, wherein each of the plurality of divided lists corresponds to one positioning cursor, and at an initial instant of the predetermined time interval, the positioning cursor points to the cached data ranked topmost in each of the divided lists, and wherein determining the amount of cached data in each of the plurality of divided lists not accessed in the predetermined time interval comprises:
  with respect to the predetermined time interval, determining a ranking position of the cached data pointed by the positioning cursor in each of the plurality of divided lists; and
  determining the amount of the cached data in each of the plurality of divided lists from the cached data located at the determined ranking position to the cached data located at the bottommost ranking position, as the amount of cached data not accessed.

6. The method according to claim 5, wherein removing the predetermined amount of cached data from the plurality of divided lists further comprises:
  cyclically removing at least one cached data not accessed included in each of the plurality of divided lists in an ascending order, beginning with the plurality of divided list ranked the bottommost, until the predetermined amount of cached data is removed.

7. The method according to claim 6, wherein cyclically removing at least one cached data not accessed included in each of the plurality of divided lists comprises:
  removing at least one not-accessed cached data ranked the bottommost in each of the plurality of divided lists each time in a cyclic manner.

8. The method according to claim 6, wherein when the sum of the amount of not-accessed cached data included in the plurality of divided lists is less than the predetermined amount, the method further comprises:
  determining the recently overall accessed timestamp of each of the plurality of divided lists, wherein the recently overall accessed timestamp indicates a time when all cached data included in each of the plurality of divided lists are accessed most recently;
  ranking the plurality of divided lists according to the recently overall accessed timestamps; and
  removing a surplus amount of cached data beginning with the plurality of divided list ranked bottommost.

9. The method according to claim 8, wherein the removing the surplus amount of cached data beginning with the plurality of divided list ranked bottommost comprises:

cyclically determining a second removable amount of each of the plurality of divided lists in an ascending order, beginning with the plurality of divided list ranked the bottommost, wherein the second removable amount is associated with the number of plurality of divided lists, a ranking position of each plurality of divided list, the surplus amount and the current already-removed amount in the ranked plurality of divided lists; and removing the second removable amount of cached data starting from the cached data ranked the bottommost in each of the plurality of divided lists, until the surplus amount of cached data are removed.

10. An apparatus for removing cached data, comprising:
a controlling device configured to determine an activeness associated with a plurality of divided lists;
the controlling device further configured to rank the plurality of divided lists in accordance with the activeness of the plurality of divided lists,
the controlling device further configured to remove a predetermined amount of cached data from the plurality of divided lists according to the ranking result when the used capacity in the cache area reaches a predetermined threshold;
wherein the controlling device is further configured to determine the amount of cached data in each of the plurality of divided lists not accessed in a predetermined time interval; and
further configured to rank the plurality of divided lists according to the determined amounts of cached data not accessed.

11. The apparatus according to claim 10, wherein the controlling device is further configured to determine a recently overall accessed timestamp of each of the plurality of divided lists, wherein the recently overall accessed timestamp indicates a time when all cached data included in each of the divided lists are accessed most recently; and
wherein the controlling device is further configured to rank the plurality of divided lists according to the recently overall accessed timestamps.

12. The apparatus according to claim 11, wherein an initial value of the recently overall accessed timestamp is a time for initializing each of the plurality of divided lists.

13. The apparatus according to claim 12, wherein the controlling device is further configured to cyclically determine a first removable amount of each of the plurality of divided lists in an ascending order, beginning with the plurality of divided list ranked the bottommost, wherein the first removable amount is associated with a number of the plurality of divided lists, a ranking position of each of the plurality divided list, the predetermined amount and the currently already-removed amount in the ranked plurality of divided lists; and to remove the determined first removable amount of cached data starting from the cached data ranked the bottommost in each of the plurality of divided lists, until the predetermined amount of cached data are removed.

14. The apparatus according to claim 10, wherein each of the plurality of divided lists corresponds to one positioning cursor, and at an initial instant of the predetermined time interval, the positioning cursor points to the cached data ranked topmost in each of the divided lists,
wherein the controlling device is further configured to, with respect to the predetermined time interval, determine a ranking position of the cached data pointed by the positioning cursor in each of the plurality of divided lists; and to determine the amount of the cached data in each of the plurality of divided lists from the cached data located at the determined ranking position to the cached data located at the bottommost ranking position, as the amount of cached data not accessed.

15. The apparatus according to claim 14, wherein the controlling device is further configured to cyclically remove at least one cached data not accessed included in each of the plurality of divided lists in an ascending order, beginning with the plurality of divided list ranked the bottommost, until the predetermined amount of cached data are removed.

16. The apparatus according to claim 15, wherein the controlling device is further configured to remove at least one not-accessed cached data ranked bottommost in each of the plurality of divided lists each time in a cyclic manner.

17. The apparatus according to claim 15, wherein when the sum of the amount of not-accessed cached data included in the plurality of divided lists is less than the predetermined amount, the controlling device further configured to determine a recently overall accessed timestamp of each of the plurality of divided lists, wherein the recently overall accessed timestamp indicates a time when all cached data included in each of the plurality of divided lists are accessed most recently;
configured to rank the plurality of divided lists according to the determined recently overall accessed timestamps; and
configured to remove a surplus amount of cached data beginning with the plurality of divided list ranked bottommost.

18. The apparatus according to claim 17, wherein the controlling device is further configured to cyclically determine a second removable amount of each of the plurality of divided lists in an ascending order, beginning with the plurality of divided list ranked the bottommost, wherein the second removable amount is associated with the number of plurality of divided lists, a ranking position of each of the plurality of divided list, the surplus amount and the currently already-removed amount in the ranked plurality of divided lists; and to remove the determined second removable amount of cached data starting from the cached data ranked the bottommost in each of the plurality of divided lists, until the surplus amount of cached data are removed.

* * * * *